June 28, 1960 K. BRAND 2,942,423
VALVE, PARTICULARLY FOR HYDRAULIC CONTROL SYSTEMS
Original Filed May 3, 1954
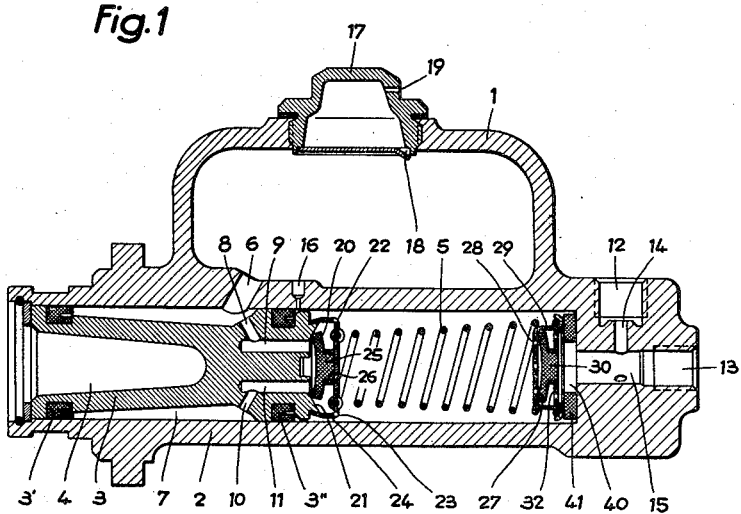
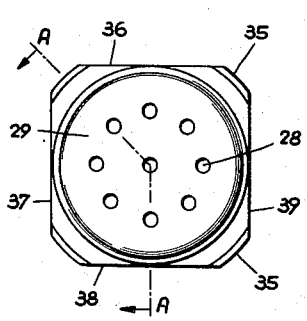
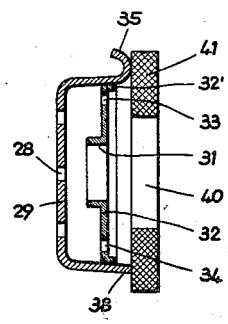
Inventor
Karl Brand
by Stevens, Davis, Miller & Mosher
his attorneys

United States Patent Office 2,942,423
Patented June 28, 1960

2,942,423

VALVE, PARTICULARLY FOR HYDRAULIC CONTROL SYSTEMS

Karl Brand, 16 S, Ebern, near Bamberg, Germany

Continuation of application Ser. No. 427,277, May 3, 1954, now Patent No. 2,925,093, dated Feb. 16, 1960. This application Apr. 24, 1956, Ser. No. 580,306

Claims priority, application Germany May 9, 1955

2 Claims. (Cl. 60—54.6)

The present application is a continuation of my pending application, Serial No. 427,277, filed May 3, 1954, now Patent No. 2,925,093. Such application relates to a valve, particularly for use with hydraulic control systems. The valve comprises a valve member made of an elastic organic material, which valve member is arranged between a valve body and an apertured carrier member located at a fixed distance therefrom, the said valve member being clamped between the said parts in such a manner that the marginal portion of the upper side of said valve member can produce a valve action in cooperation with a suitably formed portion of the valve body, whereas the central portion of said valve member bears with its underside against the said carrier member. Valves of the type briefly indicated above have proved particularly satisfactory and reliable when used in the hydraulic brake systems of automotive vehicles at the union between the master cylinder and the brake fluid reservoir.

The excellent results obtained with the valve of such application are in part responsible for the fact that it is proposed in the present invention to use valves of such type on both the piston and the bottom of the master cylinder of the control system, said valves serving, on the one hand to connect the brake fluid reservoir with the interior of the master cylinder, and, on the other hand, to connect the interior of the master cylinder with the system controlled thereby. The use of the said well-proved valves for these two purposes affords an additional advantage in that spare parts inventories are reduced due to the fact that identical parts are used at the two valve-fitted points indicated above.

In a preferred embodiment of the present invention, the valve located at the bottom of the master cylinder has a dished supporting member comprising an outwardly turned peripheral portion, and the said dished supporting member is snapped in position in the bell-shaped valve cap. This feature provides for a simplification of manufacturing procedures. Furthermore, also according to the invention, the outwardly turned peripheral portion of the bell-shaped valve cap, which portion is interrupted over at least two segments, may serve to support the piston spring. Still another improvement may be added, according to the invention, by providing a sealing ring at the bottom of the cylinder.

These and other objectives and advantages of the invention will be apparent during the course of the following specification, when read in connection with the accompanying drawings, in which:

Fig. 1 is a longitudinal sectional elevation of the master cylinder of an hydraulic brake system for an automotive vehicle and of the brake fluid reservoir connected therewith;

Fig. 2 is a plan view, on an enlarged scale, of the bell-shaped valve member of Fig. 1; and Fig. 3 is a cross-sectional view along the line A—A in Fig. 2, the valve member having been omitted.

As will be seen in the drawings, the piston 3 disposed within the master cylinder 2, which latter is connected with the brake fluid reservoir, carries two sealing cuffs 3' and 3" and is adapted to be displaced against the action of the piston spring 5 by an actuating member (not shown) which is adapted to engage in the tapering recess 4 in the outer end of the piston. The brake fluid reservoir 1 communicates with the interior of the master cylinder 2 by way of the passage 6 in the partition between the reservoir 1 and the cylinder 2, the annular space 7 between the wall of cylinder 2 and the piston 3, the pairs of passages 8, 9 and 10, 11 formed in the piston 3, and a valve mounted in the inner end of said piston, which valve will presently be described in greater detail. Another valve yet to be described, which is disposed at the bottom of the cylinder 2 places the interior of the cylinder in communication with the system to be controlled. This system to be controlled by the master cylinder may be connected to the threaded bores 12, 13 provided in the bottom portion of the cylinder 2, the desired communication being established by way of the passages 14 and 15. An equalizer passage 16 provides a communication between the reservoir 1 and the interior of the cylinder 2 whenever the piston 3 is in its extreme position on the left side as shown in Fig. 1. The brake fluid reservoir 1 may be closed with a cap member 17 having small-size apertures 18 and 19 providing a communication to atmosphere.

The aforementioned valve mounted on the piston 3 comprises a valve member 20 made of a suitable elastic organic material, and this valve member is so clamped in position between a beveled annular surface 21 formed on the free end of the piston 3 and a carrier member 24 apertured at 22 and 23 and located at a fixed distance from the said annular surface that the edge portion of the upper side of the valve member 20 cooperates with the beveled annular surface 21 to produce a valve-closing or valve-opening action, as the case may be, by having its peripheral portion flexed in relation to the beveled annular surface 21, while the central portion 25 of the valve member 20 rests with its under side against the bottom of a circular recess 26 formed on the central portion of the carrier member 24. The adjacent end of the piston spring 5 rests with its terminal coil in an annular depression of the carrier member 24 and is attached thereto by means of an eye.

The construction of the valve provided at the bottom of the cylinder is substantially identical with that of the piston-mounted valve just described. The peripheral portion of the valve member 27 rests against the inner face of a bell-shaped valve cap 29, apertured at 28, whenever the valve member is in its closed position. The central portion 30 of the valve member 27 is retained by a cylindrical flange 31 of the supporting member 32 which latter is a press fit in the bell-shaped valve cap 29, the press fit being provided according to Fig. 3 by the flanged periphery 32'. This supporting member 32 has drilled holes 33 and 34. As will be seen in Fig. 2, the flanged periphery 35 of the bell-shaped valve cap 29 is interrupted at 36, 37, 38 and 39 where suitable segments have been cut away.

Whenever the piston 3 is displaced to the right against the action of spring 5, thus causing pressure to be applied to the brake fluid contained in the cylinder 2, such brake fluid will pass through the apertures 28 and will flex the margin of the valve member 27 towards the supporting member 32. Thus, fluid will enter the space surrounded by the bell-shaped valve cap 29 and the supporting member 32, whence the fluid will pass through the apertures 33 and 34 and the central opening 40 of the sealing ring 41 to the passages 14 and 15. During this action, the piston-mounted valve will remain closed, the upturned margin 35 of the bell-shaped valve cap 29 abutting the sealing ring 41.

Upon the brake being released by releasing the piston 3 by means of the actuating member engaging in the bore 4 of the piston, there will be produced the well-known effect that the brake shoe springs of the wheel brake cylinders return the brake fluid through the associated system of lines and the passages 14 and 15 into the master cylinder 2. This pressure serves to close the valve 27 by causing its marginal portion to contact the inner face of the bell-shaped cap 29 in the manner already described. The piston spring 5 is now acted upon by the stronger pressure exerted by the brake shoe springs through the medium of the brake fluid contained in the pipe system, the spring thus being acted upon from its pipe system side, this causing the housing of the cylinder bottom valve including the valve cap 29 and the press fitted supporting member 32 to be lifted off the sealing ring 41. The brake fluid may then flow from the pipe system through the segment-like interruptions 36 to 39 of the upturned margin 35 of the bell-shaped valve cap 29 and into the master cylinder 2.

During the return movement of the piston 3 into its original position, when the pressure prevailing in the space 7 is greater than that prevailing in the space containing the piston spring 5, brake fluid will flow from the reservoir 1 via the piston-mounted valve into the space in which the piston spring 5 is disposed. It will be appreciated that this action will render the brake system ready for operation for another braking action that may follow immediately.

It will be understood that modifications and variations may be affected without departing from the spirit and scope of the novel concepts of the present invention.

I claim:

1. A master cylinder having a piston working therein and having a reservoir in communication with the pressure chamber of the cylinder through passages in the piston and through the outer face thereof, said cylinder having an outlet to a brake system and valves operatively mounted at the outer face of the piston and at the outlet to control the communication between the reservoir and the pressure chamber and the communication between the pressure chamber and the brake system, each of said valves including an identical valve member made of elastic organic material, said piston valve comprising a beveled annular surface formed on the free end of said piston and a carrier member having apertures provided thereon, said carrier member axially spaced from said annular surface to clamp said valve member against said annular surface, so that the edge portion of the upper side of said valve member cooperates with said beveled annular surface to produce valve operation, said outlet valve comprising a bell-shaped valve cap member having apertures provided thereon, said valve member having the peripheral portion thereof in operative contact with the inner face of said valve cap member in its closed position, a supporting member press fitted within said valve cap member and having an integral cylindrical flange to support the central portion of said valve member therein, said supporting member having apertures to provide fluid flow therethrough, a sealing ring provided between said valve cap member and the outlet, a spring member mounted between said carrier member and said valve cap member, so that upon release of the brakes said valve member is closed by contacting the inner face of said valve cap member causing it, along with said supporting member, to be lifted off said sealing ring against said spring member to provide a fluid flow path from the outlet into the pressure chamber, said valve mounted at the outer face of the piston providing a seal upon the development of pressure and allowing the brake fluid to be drawn through upon the disengagement of the brakes in the brake system and the valve at the outlet permitting the fluid to pass through the outlet upon the formation of pressure and maintaining a residual pressure on the rear side in the brake system upon the disengagement of the brakes, each of said valves performing an opening and closing movement during each operation of the brake system.

2. A master cylinder unit according to claim 1, characterized in that the said supporting member has an upturned circular flange portion by means of which it is press-fitted into said bell-shaped valve cap member.

References Cited in the file of this patent

UNITED STATES PATENTS

| | | |
|---|---|---|
| 1,885,121 | Loweke | Nov. 1, 1932 |
| 2,060,846 | Bowen | Nov. 17, 1936 |
| 2,133,575 | Rosenberg | Oct. 18, 1938 |
| 2,211,652 | Gardner | Aug. 13, 1940 |
| 2,241,112 | Bowen | May 6, 1941 |
| 2,304,991 | Foster | Dec. 15, 1942 |
| 2,473,168 | Milster | June 14, 1949 |
| 2,640,432 | Chappelle | June 2, 1953 |
| 2,663,540 | Erickson | Dec. 22, 1953 |
| 2,675,758 | Hughes | Apr. 20, 1954 |
| 2,682,149 | Schwenk | June 29, 1954 |
| 2,722,103 | Erickson | Nov. 1, 1955 |

FOREIGN PATENTS

| | | |
|---|---|---|
| 1,039,044 | France | May 13, 1953 |
| 680,283 | Great Britain | Oct. 1, 1952 |